US009428091B2

(12) United States Patent
Kozaki et al.

(10) Patent No.: US 9,428,091 B2
(45) Date of Patent: Aug. 30, 2016

(54) VEHICLE SEAT

(71) Applicant: TOYOTA BOSHOKU KABUSHIKI KAISHA, Aichi-ken (JP)

(72) Inventors: Keiji Kozaki, Aichi-ken (JP); Hideo Sahashi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/694,382

(22) Filed: Apr. 23, 2015

(65) Prior Publication Data

US 2015/0307003 A1 Oct. 29, 2015

(30) Foreign Application Priority Data

Apr. 25, 2014 (JP) ................................ 2014-091107

(51) Int. Cl.
*B60N 2/64* (2006.01)
*B60N 2/68* (2006.01)
*B60N 2/70* (2006.01)
*B60N 2/44* (2006.01)

(52) U.S. Cl.
CPC ............... *B60N 2/646* (2013.01); *B60N 2/449* (2013.01); *B60N 2/68* (2013.01); *B60N 2/70* (2013.01)

(58) Field of Classification Search
CPC ........ B60N 2/646; B60N 2/643; B60N 2/68; B60N 2/70; B60N 2/449
USPC ....................................... 297/452.18, 452.48
See application file for complete search history.

(56) References Cited

U.S. PATENT DOCUMENTS

| | | | | |
|---|---|---|---|---|
| 8,714,654 | B2 * | 5/2014 | Nitsuma | B60N 2/4228 297/452.2 |
| 8,979,204 | B2 * | 3/2015 | Awata | B60N 2/5825 297/218.3 |
| 2011/0089742 | A1 * | 4/2011 | Takahashi | B60H 3/00 297/452.48 |
| 2012/0326484 | A1 * | 12/2012 | Kawano | B60N 2/68 297/452.55 |
| 2013/0127225 | A1 * | 5/2013 | Kono | B60N 2/64 297/452.18 |
| 2013/0249269 | A1 * | 9/2013 | Sasaki | B60N 2/5825 297/452.18 |
| 2015/0197174 | A1 * | 7/2015 | Akutsu | B60N 2/5825 297/452.18 |

FOREIGN PATENT DOCUMENTS

| | | |
|---|---|---|
| JP | 2010-179748 | 8/2010 |

* cited by examiner

*Primary Examiner* — Milton Nelson, Jr.
(74) *Attorney, Agent, or Firm* — Greenblum & Bernstein, P.L.C.

(57) ABSTRACT

A seat pad is configured to be capable of, with an increased pressing from a top plate portion at a seating side, gradually shortening a distance between an outer side of a frame body portion and a separated part, and at the same time deflecting and deforming in a direction of immersing into a seat frame, and by a pressing from an edge portion at the seating side, an abutting part abuts against a supporting portion, so as to be supported on the seat frame.

4 Claims, 5 Drawing Sheets

UP
2
(8F, 8P, 8S) 8
6F
10 12
(6P, 6S) 6
(6b)
(6F) 12
F
(6b)
B
(6a)
(4F, 4P, 4S) 4
DN

VEHICLE SEAT

INCORPORATION BY REFERENCE

The disclosure of Japanese Patent Application No. 2014-091107 filed on Apr. 25, 2014 including the specification, drawings and abstract is incorporated herein by reference in its entirety.

BACKGROUND OF THE INVENTION

1. Field of the Invention

The invention relates to a vehicle seat provided with a seat pad (a member which includes a top plate portion and an edge portion) which elastically supports an occupant on a seat frame.

2. Description of Related Art

In a typical vehicle seat, a seat pad that elastically supports an occupant is arranged on a seat frame which constitutes a seat skeleton. Moreover, the seat pad is provided with a substantially flat top plate portion and an edge portion which protrudes toward a seating side at a side of the top plate portion. Moreover, when driving normally, the occupant causes the top plate portion to be moderately deflected while being seated, and a side portion of the occupant is supported by the edge portion when the occupant drives to make a turn or the like. Moreover, in such a seat structure, bending of the top plate portion to a larger extent (immersing into the seat) and the like is desired during vehicle collisions, so as to improve the performance of supporting the occupant.

Thus, in the technique described in Japanese Patent Application Publication No. 2010-179748 (JP 2010-179748 A), a seat pad of a seatback is provided with a top plate portion and an edge portion, and their back faces (a side facing the seat frame) are covered with a lining. Moreover, on the lining, a slit extending in an up-down direction of the seat is formed between the top plate portion and the edge portion. Accordingly, in the commonly-known technique, the seat pad is supported by the lining from below, such that the top plate portion can be moderately deflected on normal driving occasions. Furthermore, during vehicle collisions, the top plate portion bordered by the slit can be deflected to a larger extent than the edge portion and at the same time immersed into the seat.

SUMMARY OF THE INVENTION

However, in the commonly-known technique, a top plate portion bordered by a slit is deflected and deformed to a larger extent than an edge portion (providing a structure in which a shear force is applied between the top plate portion and the edge portion). Thus, in the structure in the commonly-known technique, since a seat pad may break at a slit part, it is not a structure which can be readily adopted as far as durability of the seat is concerned. Alternatively, a lining may be omitted to allow the seat pad as a whole to be easily deflected, but, if so, the supporting performance of the edge portion may deteriorate. The invention is provided in view of the aforesaid point, and the technical problem to be solved by the invention is to well maintain the supporting performance of the edge portion, and to allow a pressed top plate portion to be appropriately deflected.

A first aspect of the invention provides a vehicle seat which is provided with a seat structure member, such as a seat cushion or a seatback. Moreover, the seat structure member includes: a frame-like seat frame which constitutes a seat skeleton; and a seat pad which constitutes a contour of the seat and elastically supports an occupant. In the first aspect, the seat frame includes: a supporting portion at a seating side which can be brought into face contact with a back face of the seat pad; and a frame body portion which is connected to the supporting portion and extends in a direction separated from the seating side. Furthermore, the seat pad includes: a top plate portion on which the occupant can be seated; and an edge portion which is arranged at a position closer to an outer side of the seat than the top plate portion and protrudes toward the seating side. Moreover, when the seat pad is configured to be relatively movable on the seat frame, the top plate portion is arranged at a position closer to an inner side of the seat than the supporting portion, and the supporting portion and the frame body portion are covered with the edge portion.

Thus, in the above aspect, an abutting part configured to face the supporting portion and a separated part configured to face the frame body portion at an outer side thereof are continuously arranged on a back face of the edge portion, and based on a state where the seat pad is configured, the separated part is configured to be separated from the seat frame more than the abutting part. Moreover, the seat pad is capable of, with an increased pressing from the top plate portion at the seating side, gradually shortening a distance between the frame body portion and the separated part, and at the same time deflecting and deforming in a direction of immersing into the seat frame. Furthermore, by a pressing from the edge portion at the seating side, the abutting part abuts against the supporting portion, such that the seat pad is supported on the seat frame. In the above aspect, the seat pad as a whole shortens the distance between the seat frame (the frame body portion) and the separated part, and at the same time deflects into the seat, such that the top plate portion can be deflected (immersed) into the seat to a larger extent. Furthermore, the seat pad together with the pressed edge portion can be well supported by the seat frame (the supporting portion).

In the above aspect, the separated part may be configured to face the frame body portion at the outer side thereof without protruding from the supporting portion toward the seating side. In this aspect, the separated part is formed without emerging from the supporting portion toward the seating side, which allows the pressed edge portion to be well supported by the supporting portion without enormously immersing into a side of the seat frame.

According to the above aspects, the supporting performance of the edge portion can be well maintained, and the pressed top plate portion can be well deflected.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described below with reference to FIGS. 1-5. It should be noted that, in respective figures, a forward direction of a vehicle seat is appropriately marked with a symbol F, a backward direction of the vehicle seat is appropriately marked with a symbol B, an upward direction of the vehicle seat is appropriately marked with a symbol UP, and a downward direction of the vehicle seat is appropriately marked with a symbol DN. A vehicle seat 2 in FIG. 1 includes a seat cushion 4, a seatback 6, and a headrest 8. Each of the aforesaid seat structure members includes a seat frame (4F, 6F, 8F) which constitutes a seat skeleton, a seat pad (4P, 6P, 8P) which constitutes a contour of the seat, and a seat cover (4S, 6S, 8S) with which the seat pad is covered. In this embodiment, the seatback 6 is connected to a rear portion of the seat cushion 4 in such a manner that the seatback 6 can be raised up and put down, and the headrest 8 is arranged at an upper portion of the seatback 6 (in a raised-up state).

(Seatback) Moreover, the seatback 6 is a substantially rectangular member, which is provided with the aforesaid basic structures (6F, 6P, 6S) (see FIGS. 1 to 4, the details of each member are described below). In this embodiment, a center (a top plate portion 6*a* as described below) of the seatback 6 is substantially flat and an occupant may be seated thereon. Furthermore, two sides (edge portions 6*b* as described below) of the seatback 6 protrude toward a seating side more than the center, for example, they can support a side portion of the occupant when the occupant drives to make a turn. Moreover, in this embodiment, during vehicle collisions or the like, the center (the top plate portion 6*a*) of the seatback 6 is deflected (immersed) into the seat to a larger extent, but in this case it is preferred to well maintain a supporting performance of the two sides (the edge portions 6*b*) of the seatback 6. Thus, in this embodiment, by using a structure described below, the supporting performance of the edge portion 6*b* can be well maintained, and the pressed top plate portion 6*a* can be well deflected. The respective structures are described in detail below.

(Basic Structure) The seatback 6 in this embodiment is formed by arranging a seat pad 6P on a seat frame 6F and covering it with a seat cover 6S. The seat cover 6S is a bag-like member with which the seat pad 6P can be covered, and it may be formed of cloth (textile fabric, braided fabric, and nonwoven fabric) or leather (natural leather and synthetic leather) (see FIG. 1 and FIG. 3).

Figure 1:
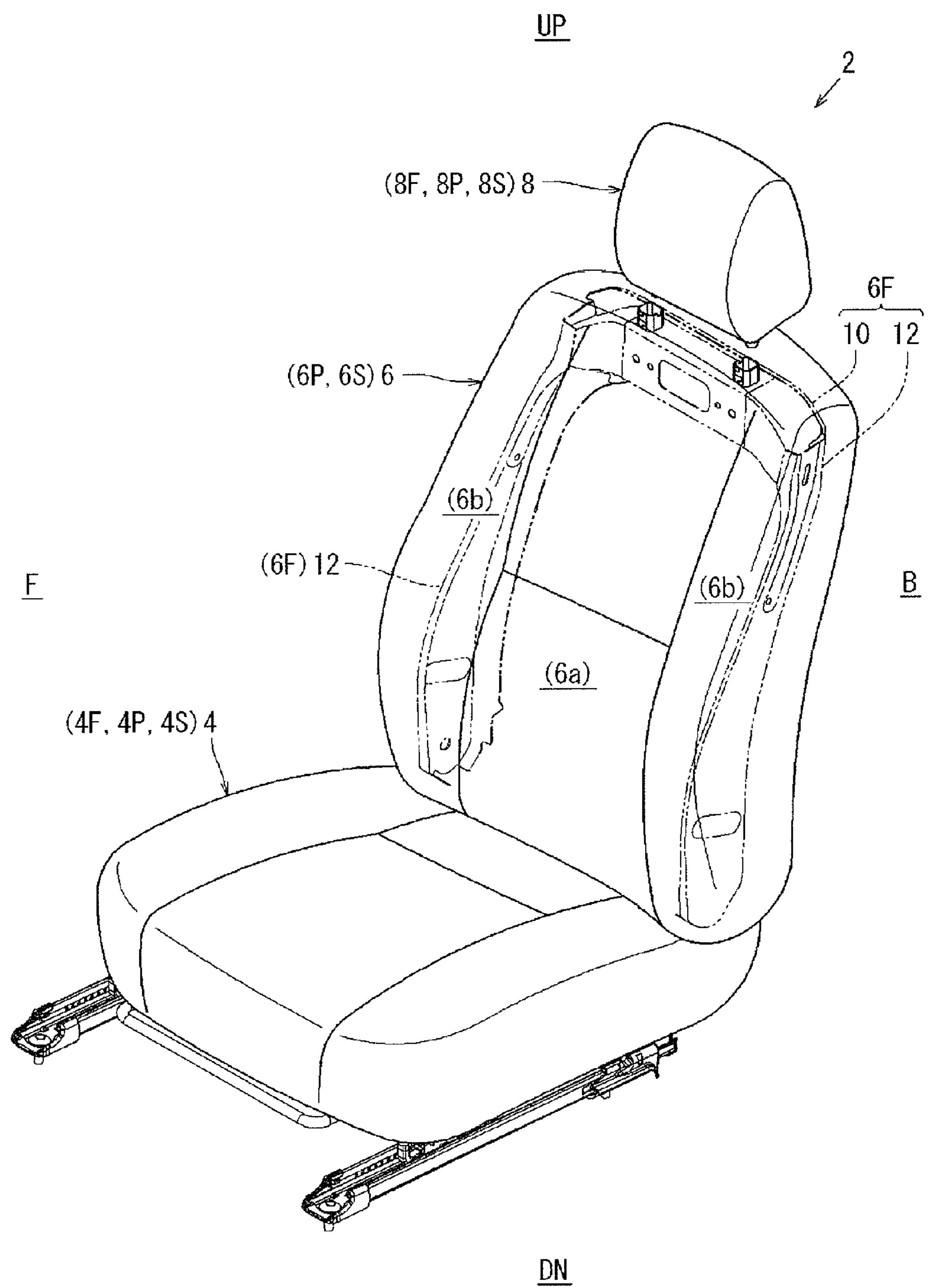
FIG. 1 is a perspective view of a vehicle seat.
Figure 2:
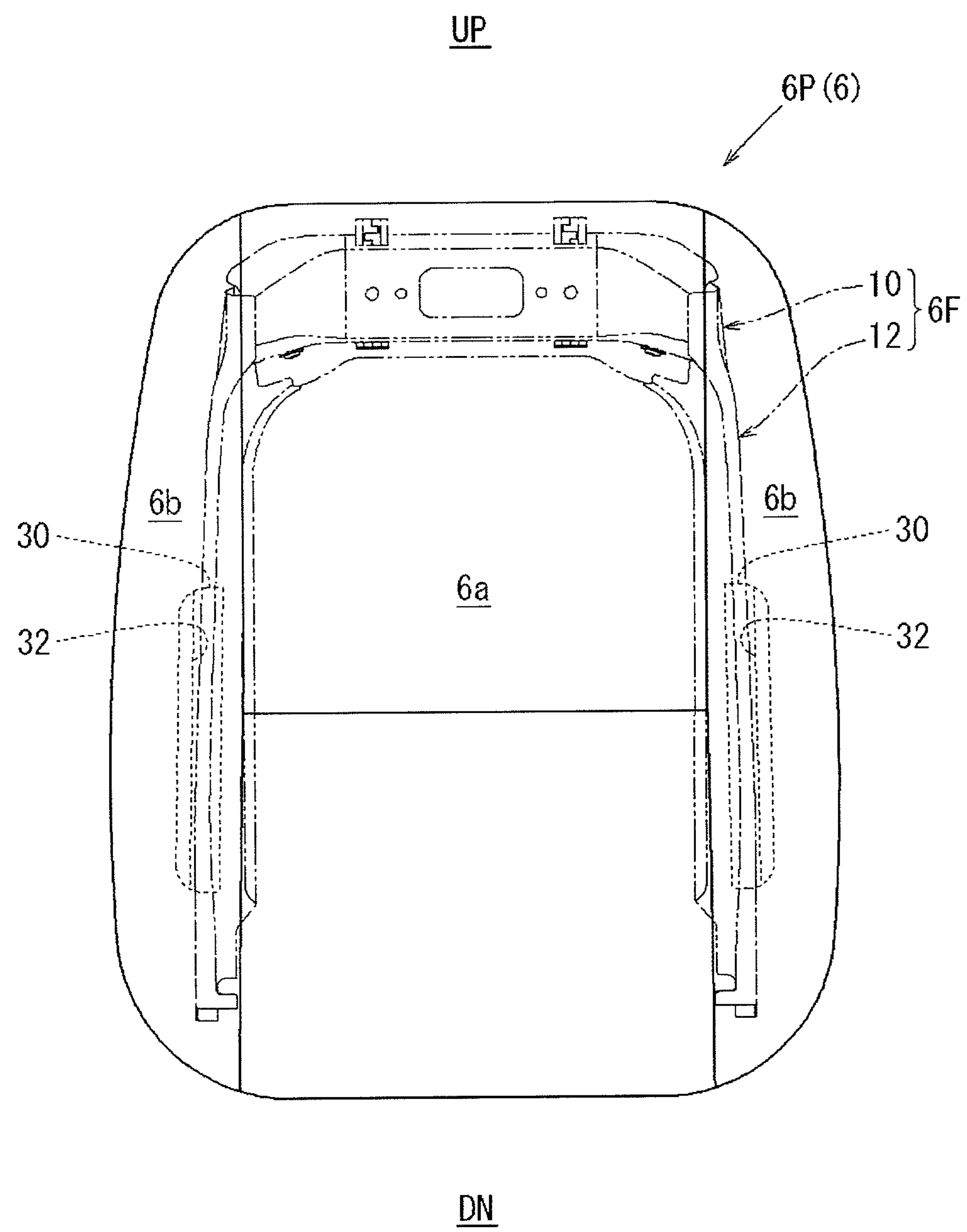
FIG. 2 is a front view of a seat pad.
Figure 3:
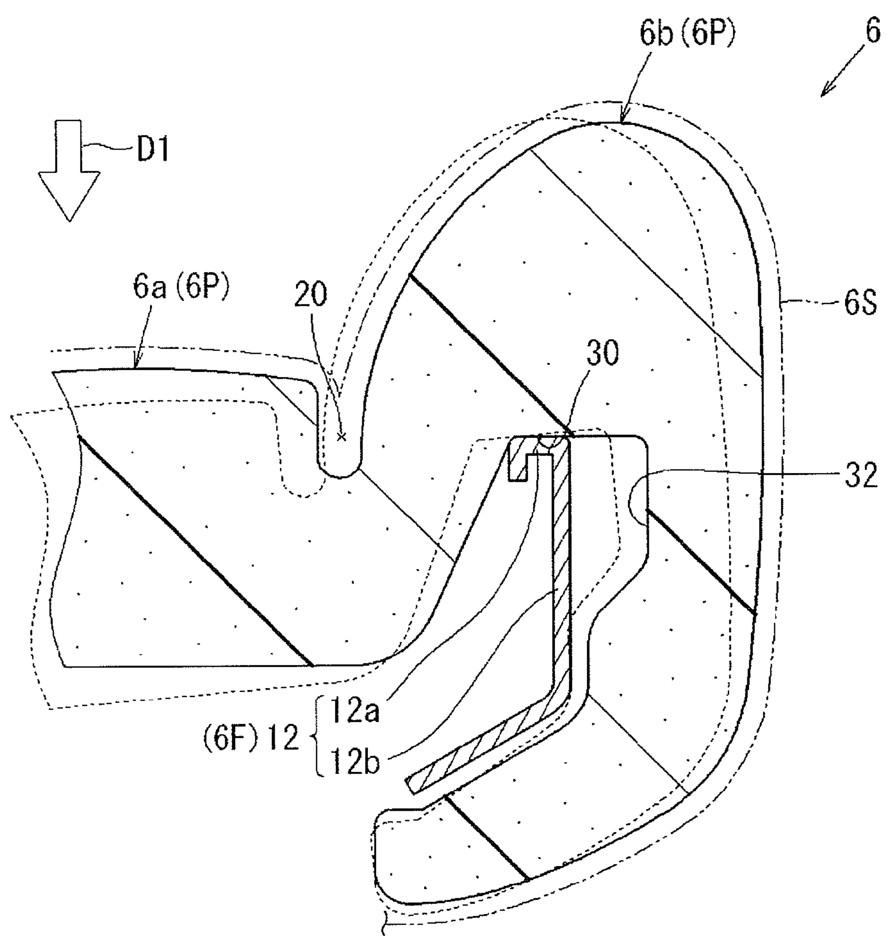
FIG. 3 is a sectional view showing a part of a seatback in a state where a top plate portion is pressed.

(Seat Frame•Supporting Portion•Frame Body Portion) Furthermore, the seat frame 6F is an arch-like frame member, and may be formed of material with superior rigidity (metal, rigid resin or the like) (see FIGS. 1 to 3). The seat frame 6F in this embodiment includes an upper frame 10 (a box-like member having a hat-shaped cross section) which constitutes an upper skeleton, and a pair of side frames 12 which constitute side skeletons. Moreover, the pair of side frames 12 are planar plate-like members respectively, and are configured to face each other at side portions of the seat. Each of the side frames 12 in this embodiment has a substantially L-shape (as observed in a sectional view), and includes a supporting portion 12*a* and a frame body portion 12*b* (see FIG. 3). The supporting portion 12*a* is a planar plate-like part which is formed by buckling a seating side of the side frame 12 toward an inner side of the seat, and provided with a substantially flat face facing the seating side (it can be brought into face contact with a back face of the seat pad 6P as described below). Furthermore, a frame body portion 12*b* is a planar plate-like part which extends from the supporting portion 12*a* toward a rear of the seat (in a direction separated from the seating side). The frame body portion 12*b* (as observed in the sectional view) in this embodiment is provided with a linear part which constitutes a side portion of the seat, and is gradually inclined toward the inner side of the seat at a rear side of the seat.

(Seat Pad Top•Plate Portion•Edge Portion) Furthermore, the seat pad 6P is a substantially rectangular (as observed in a front view) member which constitutes a contour of the seat, and may be formed of a resin capable of elastically expanding and contracting as a raw material (see FIG. 2 and FIG. 3). As an example of such a resin, foaming resin, such as polyurethane foam (with a density of 10 $kg/m^3$-60 $kg/m^3$), may be exemplified. The seat pad 6P in this embodiment has a substantially rectangular shape (as observed in the front view), and includes a top plate portion 6*a*, an edge portion 6*b*, and a groove portion 20. The top plate portion 6*a* is a (substantially flat) central part of the seat pad 6P, and an occupant can be seated thereon on normal driving occasions or the like. Furthermore, the edge portion 6*b* is a part which has a thicker wall than the top plate portion 6*a* and protrudes toward the seating side, and it includes an abutting part 30 and a separated part 32 as described below. The edge portion 6*b* in this embodiment has a substantially horizontal L-shape (as observed in the sectional view), and is capable of covering a part of the side frame 12 from the seating side to an outer surface (the outer surface of the supporting portion 12*a* and the frame body portion 12*b*) (see FIG. 3). Furthermore, the groove portion 20 is a recessed portion formed between the top plate portion 6*a* and the edge portion 6*b*, and for example, the groove portion 20 can fix a part of the seat cover 6S into a drawing-in shape.

(Abutting Part•Separated Part) Moreover, in this embodiment, the abutting part 30 and the separated part 32 are continuously arranged at a back face side of the edge portion 6*b* (see FIG. 3). The abutting part 30 is a part which constitutes a part (a part close to the top plate portion) of an inner side of the seat on the back face of the edge portion 6*b*, and can be configured along (to face) the supporting portion 12*a* based on a state where the seat pad 6P is configured. It should be noted that, the abutting part 30, based on the state where the seat pad 6P is configured, may be configured in a state of abutting against the side frame 12 (the supporting portion 12*a*), or in a state of being configured as spaced from the supporting portion 12*a* by some gap. Furthermore, the separated part 32 is a part (a thin-walled part) which is dug into a substantially rectangular shape as observed in the sectional view, and the separated part 32 is positioned continuously with the supporting portion 12*a* and formed at a position closer to an outer side of the seat than the supporting portion 12*a*. Moreover, the separated part 32, based on the state where the seat pad 6P is configured, is configured to face an outer surface of the frame body portion 12*b* (the linear part), and is separated from the side frame 12 (the frame body portion 12*b*) more than the abutting part 30. The separated part 32 in this embodiment, when the seat pad 6P is configured, can be configured to face the outer surface of the frame body portion 12*b* without protruding from the supporting portion 12*a* toward the seating side.

Here, the abutting part 30 and the separated part 32 are preferably formed at a part of the seat pad which is pressed by an occupant, and may be formed on the substantially full-length of or a part of the seat pad 6P. For example, in this embodiment, the abutting part 30 and the separated part 32 are formed at a part from a lower portion to a center of the seat pad 6P, and are configured at a part (the most pressed part) of the seat pad which can face a waist of the occupant (see FIG. 2). Moreover, at an upper portion side of the seat pad 6P, the back face of the seat pad 6P can be configured at the side frame 12 (the supporting portion 12*a* and the frame body portion 12*b*) in an abutting state.

(Configuring Operations of the Seat Pad) With reference to FIG. 1 and FIG. 3, the seat pad 6P is configured on the seat frame 6F, and is covered with the seat cover 6S. In this embodiment, the seat pad 6P is configured across the supporting portion 12*a*, and the top plate portion 6*a* is configured within the seat frame 6F (at a position closer to the inner side of the seat than the supporting portion 12*a*). Moreover, the edge portion 6*b* is configured in such a manner that it is placed on the supporting portion 12*a* and at the same time covers an outer side of the supporting portion 12*a* and the frame body portion 12*b*. In this case, the abutting part 30 is configured to face the supporting portion 12*a*, and the separated part 32 is configured to face the frame body portion 12*b* (an outer surface of the frame body portion 12*b*). Moreover, in this embodiment, the separated part 32 is configured to be separated from the side frames 12 (the frame body portion 12*b*) more than the abutting part 30 (a substantially rectangular space portion is formed between the separated part and the frame body portion).

(Behaviors of the Seat Pad) In this embodiment, on normal driving occasions or the like, the top plate portion 6*a* is appropriately deflected to allow an occupant to be seated, and a side portion of the occupant is supported by the edge portion 6*b* (see FIG. 1 and FIG. 3). Moreover, during vehicle collisions, the top plate portion 6*a* is deflected (immersed) into the seat to a larger extent to improve the performance of supporting the occupant, but in this case the supporting performance of the edge portion 6*b* should also be well maintained with the pressed top plate portion 6*a* well deflected. Thus, in this embodiment, the abutting part 30 and the separated part 32 are continuously arranged on the back face of the edge portion 6*b*, and the separated part 32 is configured to be separated from the frame body portion 12*b* more than the abutting part 30. Moreover, the seat pad 6P is configured to be capable of, with an increased pressing from the top plate portion 6*a* at the seating side, gradually shortening a distance between the frame body portion 12*b* and the separated part 32, and at the same time deflecting and deforming in a direction of immersing into the seat frame 6F (see a state marked by a broken line in FIG. 3). In addition, the seat pad 6P allows the abutting part 30 to abut against the supporting portion 12*a* by a pressing from the edge portion 6*b* at the seating side, so as to be supported on the seat frame 6F (see FIG. 4).

Moreover, during vehicle collisions, the occupant is rather heavily pressed against the top plate portion 6*a* (more heavily pressed in a direction shown by an arrow line D1 in FIG. 3 relative to normal driving occasions). In this case, the seat pad 6P as described above gradually shortens the distance (an amount of a difference between their circumferential lengths) between an outer side of the frame body portion 12*b* and the separated part 32, and at the same time moves in the direction of immersing into the seat frame 6F (see the state marked by the broken line in FIG. 3). The top plate portion 6*a* can be deflected to a larger extent and immersed into the seat by the deflection and deformation of the seat pad 6P as a whole into the seat. Accordingly, in this embodiment, the seat pad 6P as a whole moves relative to the seat frame 6F (forming a structure in which a shear force is not applied), such that the top plate portion 6*a* can be immersed to a larger extent and allow the occupant to be well supported.

Figure 4:
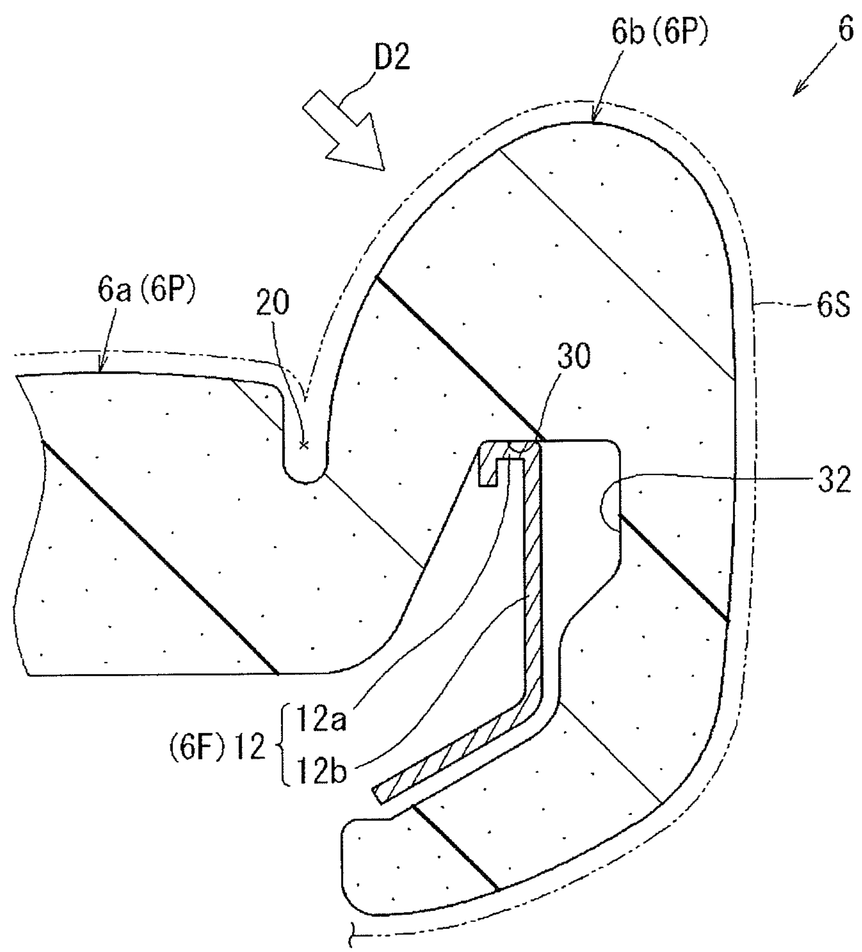
FIG. 4 is a sectional view showing a part of a seatback in a state where an edge portion is pressed.
Figure 5:
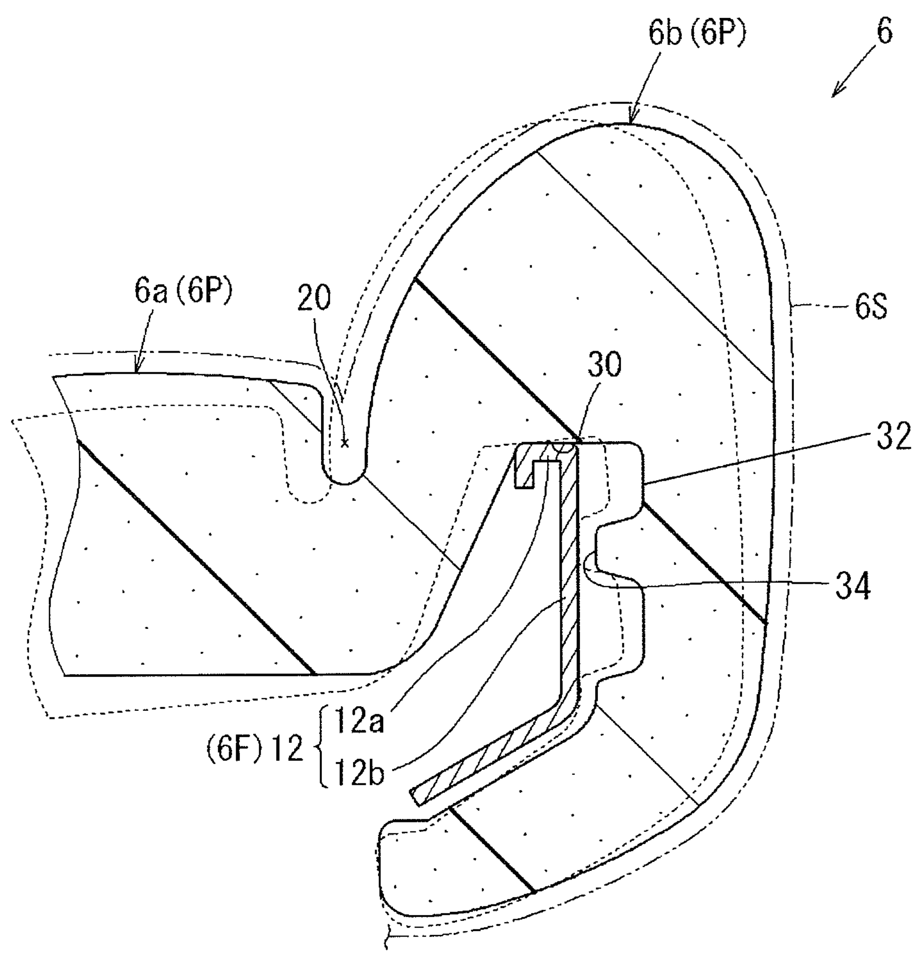
FIG. 5 is a sectional view of a part of a seatback according to a modified embodiment.

In addition, when driving to make a turn, the occupant is pressed toward the edge portion 6*b* (the edge portion is pressed in a direction marked by an arrow line D2 in FIG. 4). In this case, in this embodiment, as described above, the seat pad 6P abuts against the supporting portion 12*a* by the abutting part 30, and is well supported on the seat frame 6F (the supporting portion 12*a*) together with the pressed edge portion 6*b*. Especially in this embodiment, the separated part 32 is formed (at an appropriate position) without emerging from the supporting portion 12*a* toward the seating side. Thus, according to this embodiment, the pressed edge portion 6*b* can be well supported by the supporting portion 12*a* without enormously immersing into a side of the seat frame 6F.

As described above, according to this embodiment, the seat pad 6P as a whole shortens the distance between the seat frame 6F (the frame body portion 12*b*) and the separated part 32, and at the same time deflects toward the inner side of the seat, such that (by using a difference between the circumferential lengths of the frame body portion 12*b* and the separated part 32) the top plate portion 6*a* can be immersed to a larger extent. Furthermore, the seat pad 6P can be well supported by the seat frame 6F (the supporting portion 12*a*) together with the pressed edge portion 6*b*. Moreover, in this embodiment, during vehicle collisions or the like, the top plate portion 6*a* is deflected to a larger extent, such that a head of the occupant can abut against (be supported on) the headrest 8 as quickly as possible. Thus, according to the structure described in this embodiment, a load applied to the occupant can also be reduced by supporting the head of the occupant with the headrest 8 as quickly as possible. Furthermore, in this embodiment, the separated part 32 is formed at an appropriate position, such that the pressed edge portion 6*b* can be well supported by the supporting portion 12*a* without enormously immersing into the side of the seat frame 6F. Thus, according to this embodiment, the supporting performance of the edge portion 6*b* can be well maintained with the pressed top plate portion 6*a* well deflected.

(Modified Embodiment) Here, aside from the aforesaid structures, the separated part may also employ various structures. For example, in this modified embodiment, the separated part 32 is provided, in a midway thereof extending toward a rear of the seat, with a protruding portion 34 which is configured to protrude in a direction approaching a side of the frame body portion 12*b* and subsequently to be recessed again in a direction separated therefrom (see FIG. 5). Accordingly, the length and size (a surface area) of the separated part 32 can be increased, and the difference between the circumferential lengths of the separated part 32 and the side frame 12 can be increased (which allows the seat pad 6P to be deflected and deformed to a larger extent).

The vehicle seat in the embodiments is not limited to the aforesaid embodiments, and may also employ other various embodiments. The embodiments are described by taking the seatback 6 as an example, but the structure of the embodiments may also be applied to the seat cushion 4. For example, the structure in the embodiments is applied to a front portion side of the seat frame of the seat cushion, and the seat pad of the seat cushion is subjected to deflection (immersion) into the seat to a larger extent, such that a so-called submarine phenomenon (a forward slip of an occupant or the like) can be well prevented.

In addition, the structure (shape, size and the like) of the seat frame 6F is illustrated in the embodiments, but it is not to limit the structure of this part. For example, the supporting portion may be formed by forming the seating side of the side frame into a substantially T-shape as observed in the sectional view. Moreover, the supporting portion may also be formed by buckling an end portion of the side frame toward an outer side of the seat. Furthermore, the frame body portion may also have various shapes, such as a tubular shape, in addition to the planar plate-like shape. It should be noted that, under the circumstance that the frame body portion is configured to have the tubular shape, the supporting portion can be formed by flattening the seating side thereof into a planar shape.

In addition, in the embodiments, the structure (shape, size, position of formation, number of formation, and the like) of a back face (the abutting part 30 and the separated part 32) of the seat pad is illustrated, but it is not to limit the structure of the aforesaid respective parts. For example, as long as the abutting part is not hindered from abutting against the supporting portion, the separated part may also be formed to be at an outer side of the abutting part and emerge (protrude) toward the seating side more than the supporting portion.

In addition, the structure of the embodiments can be universally applied to vehicle seats for automobiles, aircrafts, trolleys or the like.

What is claimed is:

1. A vehicle seat, comprising:

a seat frame that constitutes a seat skeleton; and a seat pad that constitutes a contour of the seat and is configured to elastically support an occupant, wherein the seat frame is provided with a supporting portion that is configured to be brought into face contact with a back face of the seat pad, and a frame body portion that is connected to the supporting portion and extends in a direction separated from a seating side, the seat pad is provided with a top plate portion on which the occupant is to be seated, and an edge portion that is arranged at a position closer to an outer side of the seat than the top plate portion and protrudes toward the seating side, the seat pad is configured to be relatively movable on the seat frame, the top plate portion is arranged at a position closer to an inner side of the seat than the supporting portion, the edge portion covers the supporting portion and the frame body portion, on a back face of the edge portion, the seat pad has an abutting part that is configured to face the supporting portion, and a separated part that is configured to face the frame body portion at an outer side thereof and arranged continuously with the abutting part, in a state where the seat pad is configured, the separated part is configured to be separated from the seat frame more than the abutting part, when a pressing force from the top plate portion at the seating side is increased, the seat pad gradually shortens a distance between the outer side of the frame body portion and the separated part, and at the same time deflects and deforms in a direction of immersing into the seat frame, and when the edge portion is pressed from the seating side, the abutting part abuts against the supporting portion so that the seat pad is supported on the seat frame.

2. The vehicle seat according to claim 1, wherein the separated part is configured to face the frame body portion at the outer side thereof without protruding from the supporting portion toward the seating side.

3. The vehicle seat according to claim 1, wherein the outer side of the frame body portion extends from the abutting part toward a rear of the seat, and the separated part is provided with a protruding portion that protrudes toward the outer side of the frame body portion from a midway section of the separated part.

4. The vehicle seat according to claim 1, wherein the separated part includes a recessed portion that faces the outer side of the frame body portion and a bulging portion that bulges toward the outer side of the frame body portion from a rear section of the separated part provided toward the rear of the seat, and a distance between the outer side of the frame body portion and the bulging portion is shorter than a distance between the outer side of the frame body portion and the recessed portion.

* * * * *